W. H. CARR.

Assignor to G. CAMPBELL & J. CLUTE.

Burr for Knitting-Machine.

No. 8,391. Reissued Sept. 3, 1878.

Geo. Campbell.
John Clute.
Assignees of,
William H. Carr,
Inventor.

By. W. Davidson Jones
Atty.

Attest:
H. D. Perrine
M. Gardner

N. PETERS, PHOTO-LITHOGRAPHER, WASHINGTON, D. C.

UNITED STATES PATENT OFFICE.

WILLIAM H. CARR, OF TROY, NEW YORK, ASSIGNOR TO GEO. CAMPBELL AND JOHN CLUTE.

IMPROVEMENT IN BURRS FOR KNITTING-MACHINES.

Specification forming part of Letters Patent No. 43,636, dated July 26, 1864; Reissue No. 8,391, dated September 3, 1878; application filed July 12, 1878.

*To all whom it may concern:*

Be it known that WILLIAM H. CARR, of the city of Troy, in the county of Rensselaer and State of New York, invented certain new and useful Improvements in Burrs for Knitting-Machines, which improvements are fully set forth in the following specification and accompanying drawings, in which—

Figure 1:
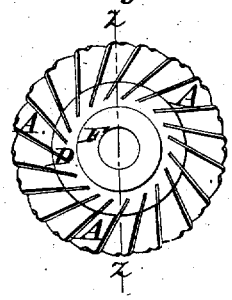
Figure 2:
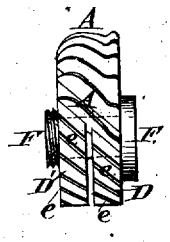
Figure 3:
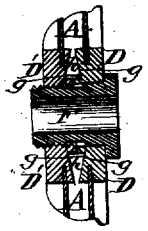
Figure 4:
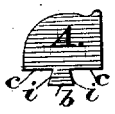
Figure 5:
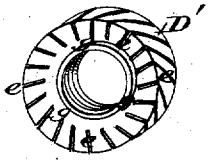
Figure 6:
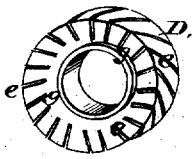
Figure 7:
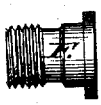

Figure 1 is an end view. Fig. 2 is a side view with part of the blades removed. Fig. 3 is a section, as indicated by the lines *z z* in Fig. 1. Fig. 4 is a side view of one of the wings or blades. Figs. 5 and 6 are perspective views of the two parts of the slotted hub which holds the blades, and Fig. 7 is a side view of the screw-bush by which the two parts of the slotted hub are secured together.

Like letters of reference indicate like parts in the several figures of the drawings.

This invention consists in the peculiar construction of the removable wings or blades of knitting-machine burrs, and also in the combination of such wings or blades with the hub and bush, whereby a more complete and efficient knitting-machine burr is produced than heretofore, and in which the necessity for clamping the removable blades at their extreme ends, as has heretofore been done, is avoided.

To enable others skilled in the art to make and use the invention, we will proceed to describe its construction.

The hub is constructed of two separable rings, D D′, (see Figs. 5 and 6,) which are provided with central holes to receive the screw-bush F or its equivalent, and with oblique slots *e e*, Figs. 5 and 6, and have their inner ends, *g g*, made hollowing or inclined outward toward each other, substantially as shown in Figs. 3, 5, and 6, so as to thereby form an outwardly-narrowed annular space, *h*, (see Fig. 3,) between the two hub-rings.

The hub-ring D′ is provided with a screw-thread, substantially as shown in Fig. 5. The central screw-bush F or its equivalent is constructed, substantially as shown in Figs. 3 and 7, of a diameter to fit the central hole in ring D, and is provided with a central hole, (see Fig. 3,) to receive the arbor or stud upon which the burr revolves. This bush is provided upon one end with a collar of somewhat arger diameter than the central hole in ring D, (see Figs. 3 and 7,) and upon the other end with a screw-thread which fits and screws into the screw in the central hole of ring D′.

The blade or wing A (see Fig. 4) is constructed from sheet metal of proper thickness in the ordinary way, and is provided with and has attached to its inner edge the dovetail or flaring projection *b*, wider at its extreme end than at the point where it is joined to the blade or wing.

The ring D is placed upon the screw-bush F close to the collar, (see Fig. 3,) and the ring D′ is screwed upon the screw of the bush F a proper distance. The rings are adjusted so that the slots *e e* exactly correspond with each other when on the bush F. A series of wings or blades, A, are placed in proper position successively in the slots *e e*, with the dovetails or flaring projections *b* extending into the outwardly-narrowed annular recess *h* formed by and between the ends *g g* of the hub-rings D D′, (see Figs. 3, 5, and 6,) and the screw-bush F is then firmly screwed into the ring D′. This action of the screw closes together endwise the two hub-rings D D′ in such manner as to cause their inclined inner ends, *g g*, to clamp against the edges *i i* of the flaring projections or dovetails on the blades or wings, and thus draw and hold them into place with their edges *c c* tightly pressed against the bottoms of the oblique slots *e e* in the hub-rings.

From this it will be seen that a cheap and durable knitting-burr is produced, from which any or all of its blades can be readily removed and replaced by others by simply unscrewing the screw-bush F, thereby loosening the hub-rings in which the blades are clamped. This knitting-burr is thinner and lighter, and more readily applied to knitting-machines of close and compact construction than a knitting-burr having projecting blades of like width clamped in a slotted hub by means of devices applied to the ends of the blades on the outside of the slotted hub.

What we claim as new, and desire to secure by Letters Patent, is—

1. A knitting-burr blade, A, having on its inner edge a dovetail or flaring projection, *b*, and shoulders *c c*, substantially as herein described.

2. A series of knitting-burr blades or wings having a dovetail or flaring projection on the inner edge of each, in combination with a hub having oblique slots and an outwardly-narrowed annular space wherein the dovetails or flaring projections of the blades are secured.

3. The combination of a series of wings or blades having a dovetail or flaring projection on the inner edge of each, a hub having oblique slots and an ontwardly-narrowed annular space, and a central hollow screw-bush or its equivalent, all operating together, as described, so as to clamp within the outwardly-narrowed annular space the edges of the dovetails or flaring projections, substantially as described.

GEORGE CAMPBELL.
JOHN CLUTE.

Witnesses:
W. DAVIDSON JONES,
C. C. WINNEY.